(12) United States Patent
Osagawa et al.

(10) Patent No.: US 12,296,844 B2
(45) Date of Patent: May 13, 2025

(54) SPEED LIMITING DEVICE AND METHOD FOR AN UNMANNED VEHICLE BASED ON INCLINATION DATA OF THE TRAVEL PATH

(71) Applicant: Komatsu Ltd., Tokyo (JP)

(72) Inventors: Kenta Osagawa, Tokyo (JP); Tomonori Ozaki, Tokyo (JP); Yuji Kobashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 106 days.

(21) Appl. No.: 17/423,188

(22) PCT Filed: Mar. 12, 2020

(86) PCT No.: PCT/JP2020/010749
§ 371 (c)(1),
(2) Date: Jul. 15, 2021

(87) PCT Pub. No.: WO2020/189484
PCT Pub. Date: Sep. 24, 2020

(65) Prior Publication Data
US 2022/0105953 A1    Apr. 7, 2022

(30) Foreign Application Priority Data

Mar. 20, 2019   (JP) .................................. 2019-053886

(51) Int. Cl.
*G08G 1/00*    (2006.01)
*B60W 40/076*  (2012.01)
(Continued)

(52) U.S. Cl.
CPC ........ *B60W 60/001* (2020.02); *B60W 40/076* (2013.01); *B60W 40/105* (2013.01); *G05D 1/0223* (2013.01); *B60W 2552/15* (2020.02)

(58) Field of Classification Search
CPC ............ B60W 60/001; B60W 2552/15; G05D 1/0223
See application file for complete search history.

(56) References Cited

U.S. PATENT DOCUMENTS 6,141,619 A * 10/2000 Sekine ................ G05D 1/0223
                                                    701/442
9,891,627 B2   2/2018 Kou et al.
(Continued)

FOREIGN PATENT DOCUMENTS

DE   102018109161 A1   10/2018
JP   2010-039839 A     2/2010
(Continued)

OTHER PUBLICATIONS

Office Action mailed Jun. 30, 2022, issued in the corresponding Australian patent application No. 2020240578.

*Primary Examiner* — Jess Whittington
*Assistant Examiner* — Rami Nabih Bedewi
(74) *Attorney, Agent, or Firm* — Troutman Pepper Locke LLP

(57) ABSTRACT

An unmanned vehicle control system includes: a speed limit calculation unit that calculates a speed limit of an unmanned vehicle based on inclination data of a travel path on the front side of the unmanned vehicle; and a travel control unit that causes the unmanned vehicle to travel based on the speed limit.

20 Claims, 8 Drawing Sheets

(51) Int. Cl.
  *B60W 40/105*  (2012.01)
  *B60W 60/00*  (2020.01)
  *G05D 1/00*  (2006.01)
  *G05D 1/02*  (2020.01)
  *G08G 1/09*  (2006.01)

(56) References Cited

U.S. PATENT DOCUMENTS

| | | | |
|---|---|---|---|
| 10,248,129 B2 | 4/2019 | Reed | |
| 2013/0035837 A1* | 2/2013 | Johansson | B60W 50/0097 701/98 |
| 2014/0207363 A1* | 7/2014 | Kanno | G01C 21/3469 701/123 |
| 2014/0358382 A1 | 12/2014 | Kou et al. | |
| 2015/0210281 A1* | 7/2015 | Johansson | B60W 50/0097 701/94 |
| 2016/0107682 A1* | 4/2016 | Tan | B60W 30/18163 701/41 |
| 2017/0269591 A1* | 9/2017 | Tanaka | G05D 1/0214 |
| 2018/0201262 A1* | 7/2018 | Yoon | B60W 10/10 |
| 2018/0222483 A1* | 8/2018 | Yoon | B60W 30/143 |
| 2018/0307236 A1 | 10/2018 | Reed | |
| 2019/0161082 A1* | 5/2019 | Fairgrieve | B60W 10/184 |
| 2019/0359213 A1* | 11/2019 | Huh | B60W 50/0097 |
| 2020/0059814 A1* | 2/2020 | Nagamura | G08G 1/164 |
| 2020/0156480 A1* | 5/2020 | Park | G05B 19/042 |
| 2020/0249686 A1* | 8/2020 | Kobashi | B60W 40/076 |

FOREIGN PATENT DOCUMENTS

| | | |
|---|---|---|
| JP | 2013-196051 A | 9/2013 |
| JP | 2015-225541 A | 12/2015 |
| JP | 2016-71564 A | 5/2016 |
| WO | 2016/084981 A1 | 6/2016 |

* cited by examiner

SPEED LIMITING DEVICE AND METHOD FOR AN UNMANNED VEHICLE BASED ON INCLINATION DATA OF THE TRAVEL PATH

FIELD

The present disclosure relates to an unmanned vehicle control system and an unmanned vehicle control method.

BACKGROUND

In a work site in a wide area such as a mine, an unmanned vehicle operates in some cases.

CITATION LIST

Patent Literature

Patent Literature 1: International Publication No. 2016/084981

SUMMARY

Technical Problem

At the work site, the unmanned vehicle travels at a speed limit according to an inclination of a travel path. However, when an unmanned vehicle enters a downhill road from a flat road, the unmanned vehicle is likely to travel beyond the speed limit on the downhill road due to a control delay. In addition, when the unmanned vehicle enters the flat road from the downhill road, it takes time for acceleration so that the productivity of the work site is likely to decrease.

Solution to Problem

According to an aspect of the present invention, an unmanned vehicle control system comprises: a speed limit calculation unit that calculates a speed limit of an unmanned vehicle based on inclination data of a travel path on a front side of the unmanned vehicle; and a travel control unit that causes the unmanned vehicle to travel based on the speed limit.

Advantageous Effects of Invention

According to an aspect of the present invention, the unmanned vehicle can be made to travel at an appropriate travel speed.

DESCRIPTION OF EMBODIMENTS

Hereinafter, an embodiment of the present disclosure will be described with reference to the drawings, but the present invention is not limited thereto. Components of the embodiment to be described below can be combined as appropriate. In addition, there is also a case where some components are not used.

[Management System]

Figure 1:
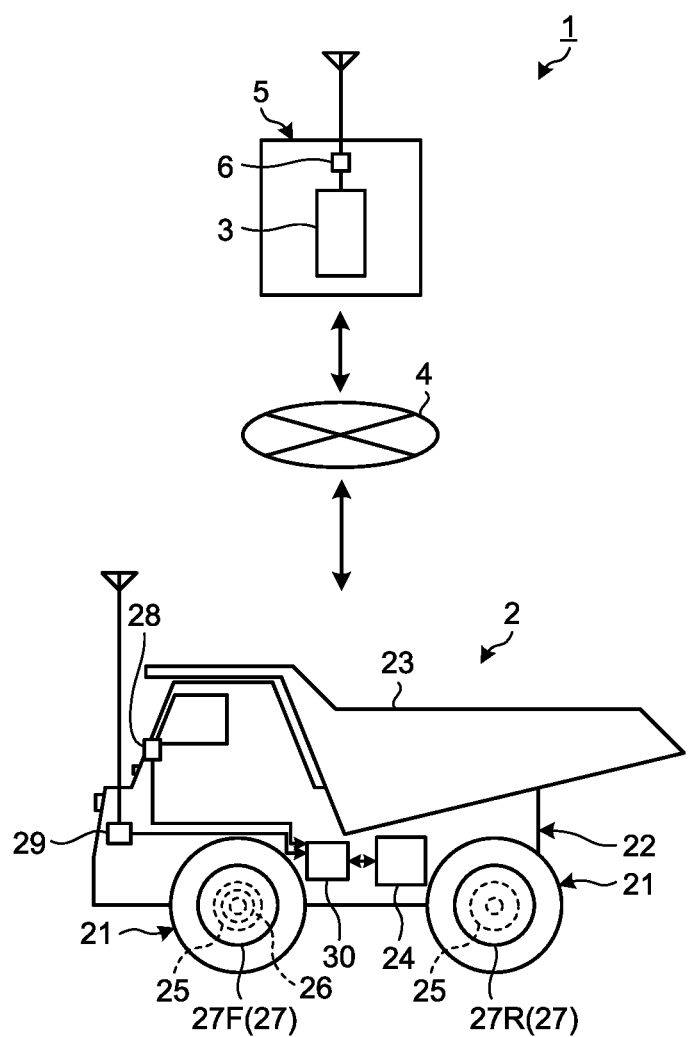
FIG. 1 is a view schematically illustrating an example of a management system according to the present embodiment.

FIG. 1 is a view schematically illustrating an example of a management system 1 according to the present embodiment. The management system 1 includes an unmanned vehicle 2, a management device 3, and a communication system 4. The unmanned vehicle 2 operates at a work site. In the present embodiment, the work site is a mine or a quarry. The mine refers to a place or a business site where a mineral is mined.

The unmanned vehicle 2 refers to a vehicle that operates in an unmanned manner without any driving operation performed by a driver. The unmanned vehicle 2 is a dump truck which is a kind of transport vehicle that travels at the work site and transports a cargo. As the cargo transported by the unmanned vehicle 2, ore or dirt excavated in the mine or the quarry is exemplified.

Note that the work site is not limited to the mine or the quarry. The work site may be any work site where the transport vehicle carries the cargo.

The management device 3 includes a computer system and is installed in a control facility 5 at the work site, for example. The communication system 4 performs communication between the management device 3 and the unmanned vehicle 2. The management device 3 is connected with a wireless communication device 6. The communication system 4 includes the wireless communication device 6. The management device 3 and the unmanned vehicle 2 wirelessly communicate with each other via the communication system 4.

[Unmanned Vehicle]

The unmanned vehicle 2 travels at the work site based on travel course data transmitted from the management device 3. The unmanned vehicle 2 includes a traveling device 21, a vehicle main body 22 supported by the traveling device 21, a dump body 23 supported by the vehicle main body 22, and a control device 30.

The traveling device 21 includes a drive device 24 that drives the traveling device 21, a brake device 25 that brakes the traveling device 21, a steering device 26 that adjusts a traveling direction, and wheels 27.

The unmanned vehicle 2 travels autonomously as the wheels 27 rotate. The wheels 27 include front wheels 27F and rear wheels 27R. Tires are mounted on the wheels 27.

The drive device 24 generates a driving force for accelerating the unmanned vehicle 2. The drive device 24 includes an internal combustion engine such as a diesel engine. Note that the drive device 24 may include an electric motor. Power generated by the drive device 24 is transmitted to the rear wheels 27R. The brake device 25 generates a braking force for decelerating or stopping the unmanned vehicle 2. The steering device 26 can adjust the traveling direction of the unmanned vehicle 2. The traveling direction of the unmanned vehicle 2 includes a direction of a front portion of the vehicle main body 22. The steering device 26 adjusts the traveling direction of the unmanned vehicle 2 by steering the front wheels 27F.

The control device 30 can communicate with the management device 3 present outside the unmanned vehicle 2. The control device 30 outputs a driving command to control the traveling device 21. The driving command includes an accelerator command for operating the drive device 24, a brake command for operating the brake device 25, and a steering command for operating the steering device 26. The drive device 24 generates a driving force for accelerating the unmanned vehicle 2 based on the accelerator command output from the control device 30. As the output of the drive device 24 is adjusted, the travel speed of the unmanned vehicle 2 is adjusted. The brake device 25 generates a braking force for decelerating the unmanned vehicle 2 based on the brake command output from the control device 30. The steering device 26 generates a force for changing a direction of the front wheels 27F so as to make the unmanned vehicle 2 travel straight or swing based on the steering command output from the control device 30.

In addition, the unmanned vehicle 2 includes a position detection device 28 that detects a position of the unmanned vehicle 2. The position of the unmanned vehicle 2 is detected using a global navigation satellite system (GNSS). The global navigation satellite system includes a global positioning system (GPS). The global navigation satellite system detects an absolute position of the unmanned vehicle 2 specified by coordinate data of the latitude, longitude, and altitude. The position of the unmanned vehicle 2 specified in a global coordinate system is detected by the global navigation satellite system. The global coordinate system is a coordinate system fixed to the earth. The position detection device 28 includes a GNSS receiver and detects the absolute position (coordinates) of the unmanned vehicle 2.

In addition, the unmanned vehicle 2 includes a wireless communication device 29. The communication system 4 includes the wireless communication device 29. The wireless communication device 29 can wirelessly communicate with the management device 3.

[Work Site]

Figure 2:
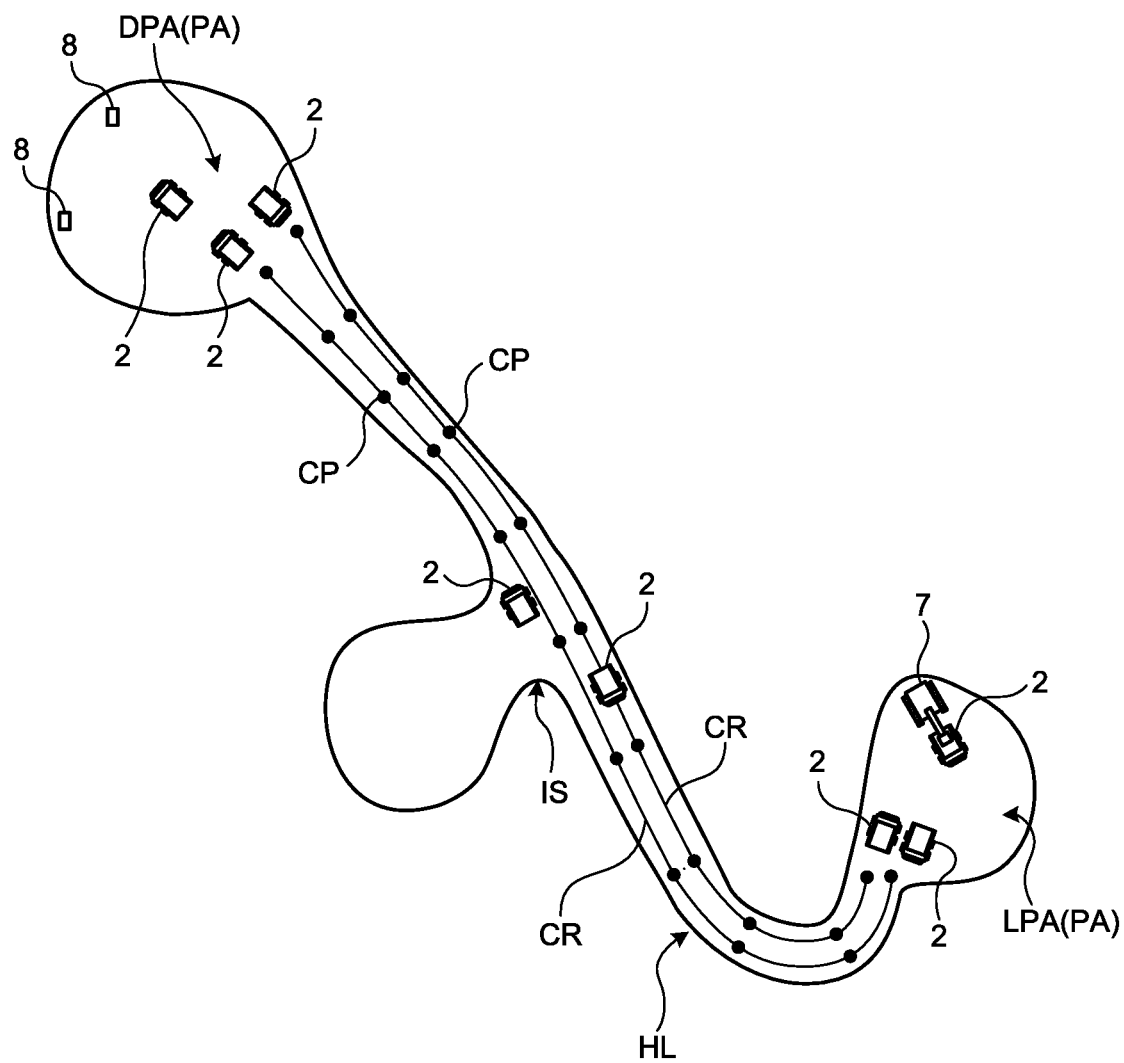
FIG. 2 is a view schematically illustrating an example of a work site according to the present embodiment.

FIG. 2 is a view schematically illustrating an example of the work site according to the present embodiment. The unmanned vehicle 2 travels on at least a part of a work site PA of a mine and a travel path HL leading to the work site PA. The work site PA includes at least one of a loading site LPA and a discharging site DPA. The travel path HL includes an intersection IS.

The loading site LPA refers to an area where loading work for loading the cargo on the unmanned vehicle 2 is performed. A loader 7 operates at the loading site LPA. The loader 7 is, for example, an excavator or a rope excavator having working equipment. The discharging site DPA refers to an area where discharging work for discharging the cargo from the unmanned vehicle 2 is performed. For example, a crusher 8 is provided at the discharging site DPA.

The unmanned vehicle 2 travels at the work site based on the travel course data indicating a travel condition of the unmanned vehicle 2. As illustrated in FIG. 2, the travel course data includes a plurality of course points CP set at intervals. The course point CP defines a target position of the unmanned vehicle 2. A target travel speed and a target travel direction of the unmanned vehicle 2 are set for each of the plurality of course points CP. In addition, inclination data indicating an inclination angle of the travel path HL is set for each of the plurality of course points CP. In addition, the travel course data includes a travel course CR indicating a target travel route of the unmanned vehicle 2. The travel course CR is defined by a line connecting the plurality of course points CP.

The travel course CR is set in the travel path HL and the work site PA. The unmanned vehicle 2 travels on the travel path HL according to the travel course CR.

The travel course data is generated in the management device 3. The management device 3 transmits the generated travel course data to the control device 30 of the unmanned vehicle 2 via the communication system 4. The control device 30 controls the traveling device 21 such that the unmanned vehicle 2 travels along the travel course CR based on the travel course data and travels according to the target travel speed and the target travel direction set for each of the plurality of course points CP.

[Management Device and Control Device]

Figure 3:
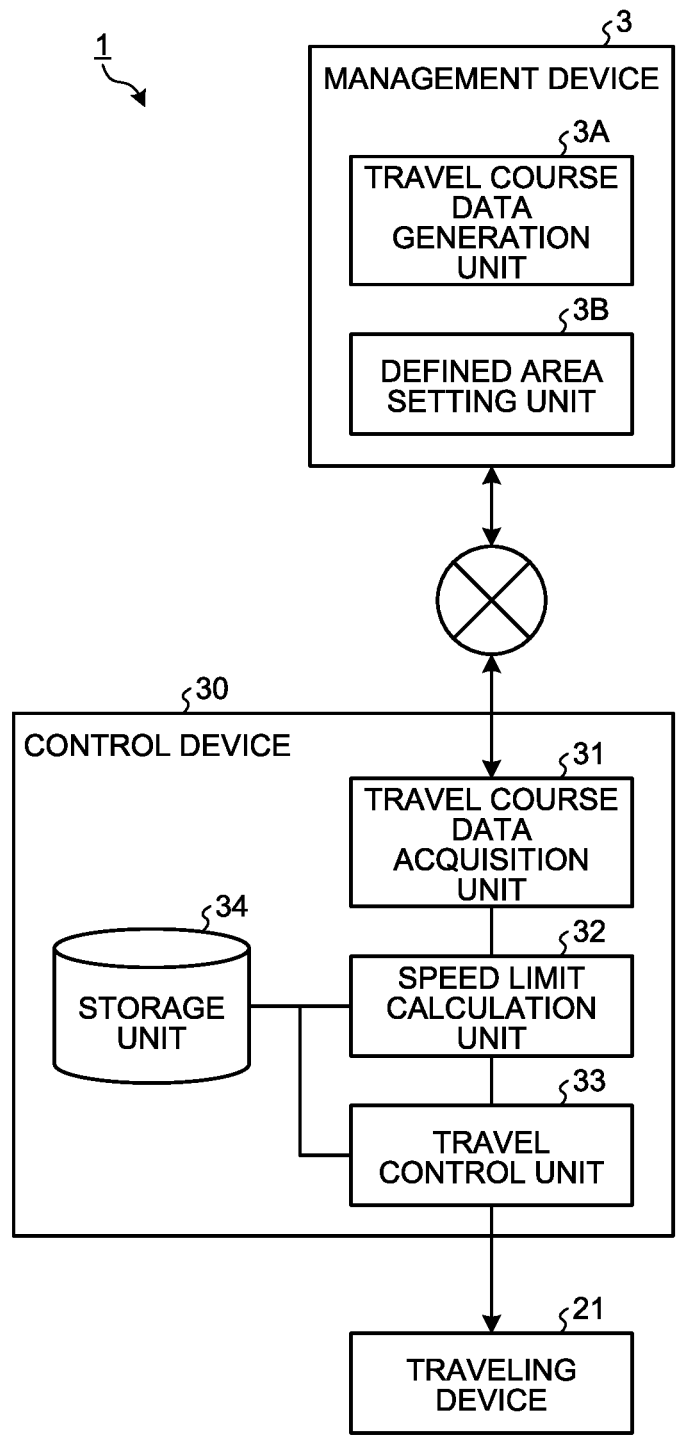
FIG. 3 is a functional block diagram illustrating an example of the management system according to the present embodiment.

FIG. 3 is a functional block diagram illustrating an example of the management system 1 according to the present embodiment. The management system 1 includes the management device 3 and the control device 30.

The management device 3 has a travel course data generation unit 3A and a defined area setting unit 3B.

The travel course data generation unit 3A generates the travel course data. The travel course data generated by the travel course data generation unit 3A is transmitted to the control device 30 of the unmanned vehicle 2.

The defined area setting unit 3B sets a defined area on the front side of the unmanned vehicle 2. The defined area is an area where the unmanned vehicle 2 is scheduled to travel.

The control device 30 includes a travel course data acquisition unit 31, a speed limit calculation unit 32, a travel control unit 33, and a storage unit 34.

The travel course data acquisition unit 31 acquires the travel course data of the unmanned vehicle 2 transmitted from the travel course data generation unit 3A.

The speed limit calculation unit 32 calculates a speed limit of the unmanned vehicle 2 based on the inclination data of the travel path HL on the front side of the unmanned vehicle 2. The inclination data includes the inclination angle of the travel path HL. The inclination data may include a height of the course point CP.

The inclination angle of the travel path HL is known data. The inclination data is set for each of the plurality of course points CP. The speed limit calculation unit 32 can acquire the inclination data of the front side of the unmanned vehicle 2 from the travel course data.

A slope of the travel path HL changes. The travel path HL has a flat road substantially parallel to the horizontal plane, a downhill road including a downhill, and an uphill road including an uphill. The speed limit calculation unit 32 calculates the speed limit of the unmanned vehicle 2 at each of the course points CP of the flat road, the downhill road, and the uphill road at the work site.

The travel control unit 33 causes the unmanned vehicle 2 to travel based on the travel course data and the speed limit. The travel control unit 33 outputs the driving command to the traveling device 21 such that the unmanned vehicle 2 travels according to the travel course data. The travel control unit 33 outputs the driving command to the traveling device 21 such that a travel speed of the unmanned vehicle 2 does not exceed the speed limit.

The storage unit 34 stores correlation data indicating the relationship between the inclination angle of the travel path HL and the speed limit of the unmanned vehicle 2.

Figure 4:
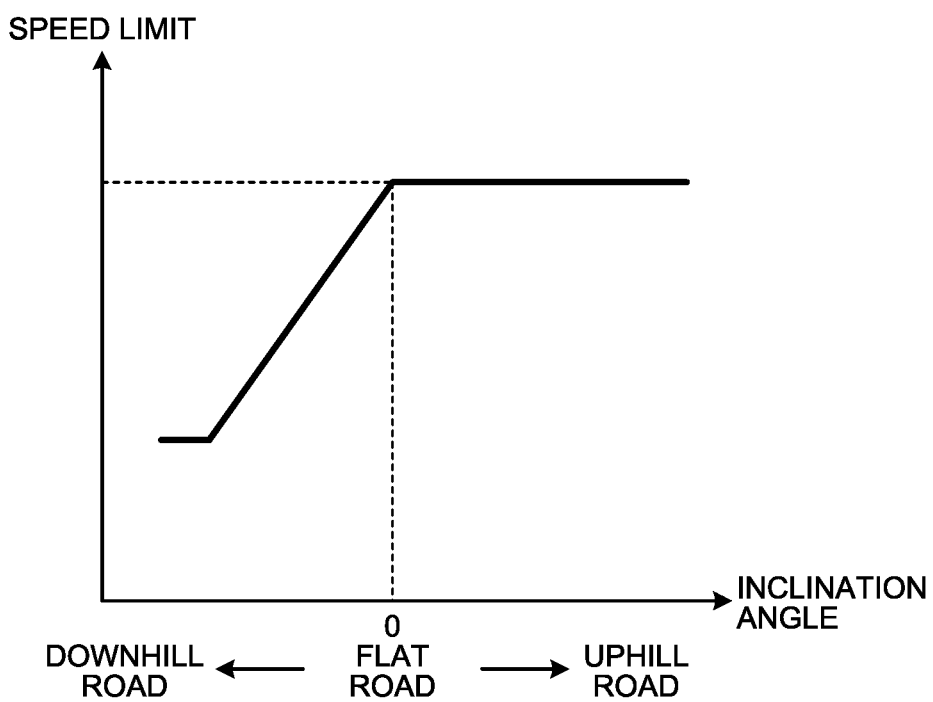
FIG. 4 is a graph illustrating an example of correlation data indicating the relationship between an inclination angle of a travel path and a speed limit of an unmanned vehicle according to the present embodiment.

FIG. 4 is a graph illustrating an example of the correlation data indicating the relationship between the inclination angle of the travel path HL and the speed limit of the unmanned vehicle 2 according to the present embodiment. In the graph illustrated in FIG. 4, the horizontal axis represents the inclination angle, and the vertical axis represents the speed limit. A speed limit on the downhill road is lower than speed limits on the flat road and the uphill road. The speed limit on the downhill road becomes lower as the inclination angle increases.

In the example illustrated in FIG. 4, the speed limit is set based on the performance of the unmanned vehicle 2. The speed limit is set to the maximum value on the flat road and the uphill road. Note that the correlation data is not necessarily the graph.

The travel control unit 33 controls the travel speed of the unmanned vehicle 2 based on the correlation data stored in the storage unit 34 in each of cases where the unmanned vehicle 2 travels on the flat road, travels on the downhill road, and travels on the uphill road. That is, the travel control unit 33 controls the travel speed of the unmanned vehicle 2 based on the inclination angle of the travel path HL set in the course CP and the correlation data stored in the storage unit 34 so as not to exceed the speed limit corresponding to the inclination angle set on the course point CP when traveling on the course point CP set on the travel path HL.

The travel control unit 33 controls the travel speed of the unmanned vehicle 2 based on the speed limit when the unmanned vehicle 2 is located at each of the course points CP of the flat road, the downhill road, and the uphill road.

[Speed Limit when Transitioning from Flat Road to Downhill Road]

Figure 5:
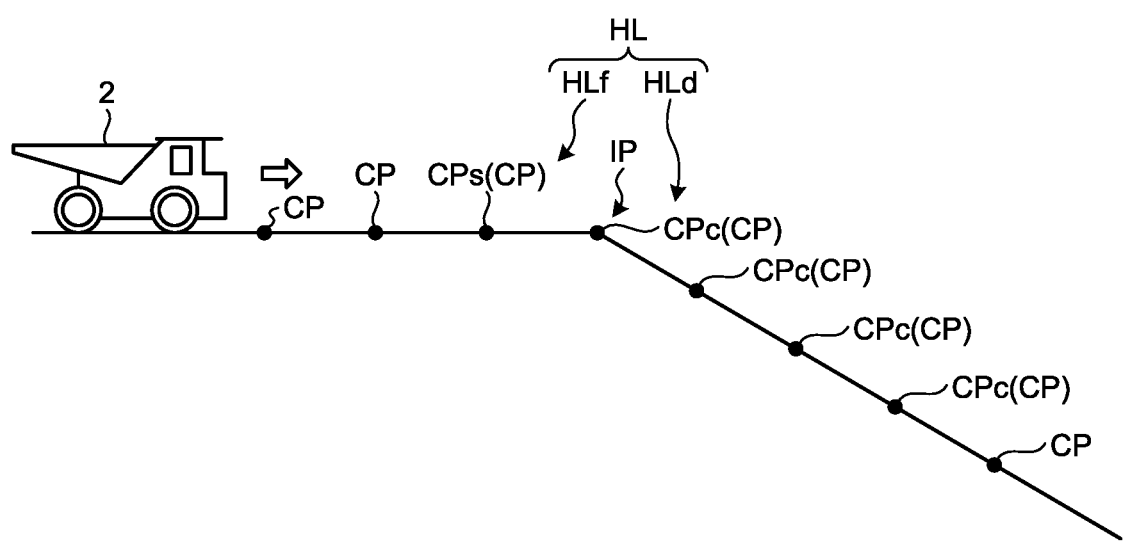
FIG. 5 is a view for describing a method of calculating the speed limit when the unmanned vehicle according to the present embodiment transitions from a state of traveling on a flat road to a state of traveling on a downhill road.

FIG. 5 is a view for describing a method of calculating the speed limit when the unmanned vehicle 2 according to the present embodiment transitions from a state of traveling on a flat road HLf to a state of traveling on a downhill road HLd.

In the example illustrated in FIG. 5, the travel path HL on the front side of the unmanned vehicle 2 includes the flat road HLf and the downhill road HLd connected to the flat road HLf via an inflection point IP on the front side of the flat road HLf. The flat road HLf is a first travel path with a first inclination angle. The downhill road HLd is a second travel path with a second inclination angle. The downhill road HLd is arranged on the front side of the flat road HLf.

In the example illustrated in FIG. 5, the inflection point IP is a boundary between the flat road HLf and the downhill road HLd.

In addition, a plurality of course points CP are set on the travel path HL on the front side of the unmanned vehicle 2. Each of the plurality of course points CP includes inclination data at a position of the course point CP.

In the present embodiment, a target course point CPs for which the speed limit is calculated is set. The speed limit calculation unit 32 calculates the speed limit at the target course point CPs on the front side of the unmanned vehicle 2 based on an inclination angle related to a calculation course point CPc on the front side of the target course point CPs.

The target course point CPs is set on the flat road HLf. That is, the target course point CPs is set on the rear side of the inflection point IP. The target course point CPs is set between the unmanned vehicle 2 traveling on the flat road HLf and the inflection point IP.

The calculation course point CPc may be one or plural. When there is one calculation course point CPc, the calculation course point CPc is set on the downhill road HLd. That is, the calculation course point CPc is set on the front side of the inflection point IP. When there are a plurality of calculation course points CPc, at least one of the calculation course points CPc is set on the downhill road HLd. When there are a plurality of calculation course points CPc, some of the calculation course points CPc may be set on a flat road CPf, and some of the calculation course points CPc may be set on a downhill road CPd. When there are a plurality of calculation course points CPc, all of the plurality of calculation course points CPc may be set on the downhill road HLd.

In the present embodiment, the speed limit calculation unit 32 calculates the speed limit based on an average value $\theta av$ of an inclination angle related to the target course point CPs and the inclination angle related to the calculation course point CPc.

In the example illustrated in FIG. 5, four course points CP on the front side of the target course point CPs are set as the calculation course points CPc. When the inclination angle related to the target course point CPs is $\theta s$ and inclination angles related to the four calculation course points CPc are $\theta c1$, $\theta c2$, $\theta c3$, and $\theta c4$, respectively, the speed limit calculation unit 32 executes an operation of $[(\theta s+\theta c1+\theta c2+\theta c3+\theta c4)/5]$ to calculate the average value $\theta av$ of the inclination angles.

The speed limit calculation unit 32 calculates the speed limit at the target course point CPs based on the correlation data stored in the storage unit 34 and the calculated average value $\theta av$ of the inclination angles. That is, the speed limit at the target course point CPs is determined as the speed limit corresponding to the average value $\theta av$ in the correlation data described with reference to FIG. 4.

Note that the speed limit calculation unit 32 may calculate the speed limit based on an inclination angle related to one calculation course point CPc without using the average value $\theta av$.

Immediately after the unmanned vehicle 2 transitions from the state of traveling on the flat road HLf to the state of traveling on the downhill road HLd, the travel speed of the unmanned vehicle 2 is likely to exceed the speed limit. As described with reference to FIG. 4, the speed limit of the downhill road HLd is set to a low value, but the travel speed of the unmanned vehicle 2 is likely to exceed the speed limit because deceleration of the unmanned vehicle 2 is not achieved in time due to a control delay of the control device 30, for example, immediately after the unmanned vehicle 2 transitions from the state of traveling on the flat road HLf to the state of traveling on the downhill road HLd.

In particular, in a state where the dump body 23 is loaded with the cargo, the total weight of the unmanned vehicle 2 becomes large, and thus, the deceleration of the unmanned vehicle 2 is not achieved in time only by operating the brake device 25, so that the travel speed of the unmanned vehicle 2 is more likely to exceed the speed limit as compared with a state where the dump body 23 is not loaded with any cargo.

In addition, the travel path HL at the work site is highly likely to be an unpaved road which is not paved. Therefore, a situation of a road surface of the travel path HL changes daily due to, for example, traveling of the unmanned vehicle 2 or the weather. The travel speed of the unmanned vehicle 2 is highly likely to exceed the speed limit due to the situation of the road surface of the travel path HL.

In the present embodiment, the speed limit at the target course point CPs on the rear side of the inflection point IP is reduced based on an inclination angle on the downhill road HLd on the front side of the inflection point IP. That is, in the present embodiment, the deceleration of the unmanned vehicle 2 is started at the target course point CPs on the rear side of the inflection point IP based on the speed limit set at the calculation course point CPc on the front side of the inflection point IP. As a result, the travel speed of the unmanned vehicle 2 is suppressed from exceeding the speed limit immediately after the unmanned vehicle 2 transitions from the state of traveling on the flat road HLf to the state of traveling on the downhill road HLd.

[Speed Limit when Transitioning from Downhill Road to Flat Road]

Figure 6:
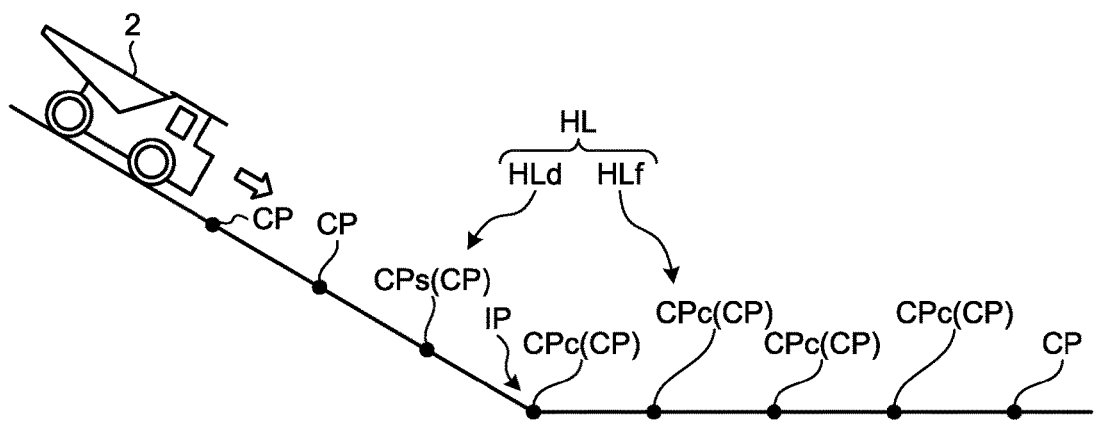
FIG. 6 is a view for describing a method of calculating the speed limit when the unmanned vehicle according to the present embodiment transitions from a state of traveling on a downhill road to a state of traveling on a flat road.

FIG. 6 is a view for describing a method of calculating the speed limit when the unmanned vehicle 2 according to the present embodiment transitions from a state of traveling on the downhill road HLd to a state of traveling on the flat road HLf.

In the example illustrated in FIG. 6, the travel path HL on the front side of the unmanned vehicle 2 includes the downhill road HLd and the flat road HLf connected to the downhill road HLd via the inflection point IP on the front side of the downhill road HLd. The downhill road HLd is a first travel path with a first inclination angle. The flat road HLf is a second travel path with a second inclination angle. The flat road HLf is arranged on the front side of the downhill road HLd. In the example illustrated in FIG. 6, the inflection point IP is a boundary between the downhill road HLd and the flat road HLf.

In addition, a plurality of course points CP are set on the travel path HL on the front side of the unmanned vehicle 2. Each of the plurality of course points CP includes inclination data at a position of the course point CP.

The speed limit calculation unit 32 calculates the speed limit at the target course point CPs on the front side of the unmanned vehicle 2 based on an inclination angle related to a calculation course point CPc on the front side of the target course point CPs.

The target course point CPs is set on the downhill road HLd. That is, the target course point CPs is set on the rear side of the inflection point IP. The target course point CPs is set between the unmanned vehicle 2 traveling on the downhill road HLd and the inflection point IP.

The speed limit calculation unit 32 calculates the speed limit based on an average value of an inclination angle related to the target course point CPs and the inclination angle related to the calculation course point CPc.

In the example illustrated in FIG. 6, four course points CP on the front side of the target course point CPs are set as the calculation course points CPc. When the inclination angle related to the target course point CPs is $\theta s$ and inclination angles related to the four calculation course points CPc are $\theta c1$, $\theta c2$, $\theta c3$, and $\theta c4$, respectively, the speed limit calculation unit 32 executes an operation of $[(\theta s+\theta c1+\theta c2+\theta c3+\theta c4)/5]$ to calculate the average value $\theta av$ of the inclination angles.

When calculating the average value $\theta av$ of the inclination angles, not only the inclination angles $\theta c1$, $\theta c2$, $\theta c3$, and $\theta c4$ but also the inclination angle $\theta s$ is considered, so that the travel speed of the unmanned vehicle 2 is controlled even before the unmanned vehicle 2 enters the flat road HLf.

The speed limit calculation unit 32 calculates the speed limit at the target course point CPs based on the correlation data stored in the storage unit 34 and the calculated average value $\theta av$ of the inclination angles. That is, the speed limit at the target course point CPs is determined as the speed limit corresponding to the average value $\theta av$ in the correlation data described with reference to FIG. 4.

Note that the speed limit calculation unit 32 may calculate the speed limit based on an inclination angle related to one calculation course point CPc without using the average value $\theta av$.

Immediately after the unmanned vehicle 2 transitions from the state of traveling on the downhill road HLd to the state of traveling on the flat road HLf, the travel speed of the unmanned vehicle 2 is likely to be insufficient. As described with reference to FIG. 4, the speed limit of the flat road HLf is set to a high value, but the travel speed of the unmanned vehicle 2 is likely to be insufficient because acceleration of the unmanned vehicle 2 is not achieved in time immediately after the unmanned vehicle 2 transitions from the state of traveling on the downhill road HLd to the state of traveling on the flat road HLf.

In particular, in a state where the dump body 23 is loaded with the cargo, the total weight of the unmanned vehicle 2 becomes large, and thus, the acceleration of the unmanned vehicle 2 is not achieved in time even if the output of the drive device 24 is increased, so that the travel speed of the unmanned vehicle 2 is more likely to be insufficient as compared with a state where the dump body 23 is not loaded with any cargo.

In addition, the travel path HL at the work site is highly likely to be an unpaved road which is not paved. Therefore, a situation of a road surface of the travel path HL changes daily due to, for example, traveling of the unmanned vehicle 2 or the weather. The travel speed of the unmanned vehicle 2 is highly likely to be insufficient due to the situation of the road surface of the travel path HL.

In the present embodiment, the speed limit at the target course point CPs on the rear side of the inflection point IP is increased based on an inclination angle on the downhill road HLd on the front side of the inflection point IP. That is, in the present embodiment, the acceleration of the unmanned vehicle 2 is started at the target course point CPs on the rear side of the inflection point IP based on the speed limit set at the calculation course point CPc on the front side of the inflection point IP. As a result, the travel speed of the unmanned vehicle 2 is suppressed from being insufficient immediately after the unmanned vehicle 2 transitions from the state of traveling on the downhill road HLd to the state of traveling on the flat road HLf.

Note that the method of calculating the speed limit when the unmanned vehicle 2 transitions from the state of traveling on the downhill road HLd to the state of traveling on the flat road HLf has been described with reference to FIG. 6. The same applies to a case where the unmanned vehicle 2 transitions from the state of traveling on the downhill road HLd to the state of traveling on an uphill road HLu.

[Defined Area]

Figure 7:
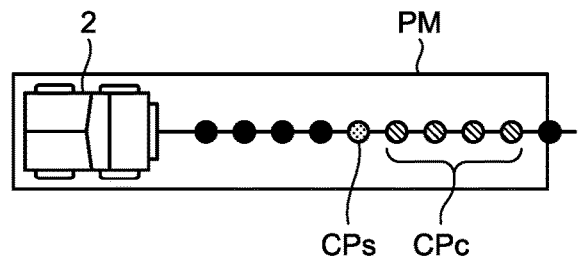
FIG. 7(A) and FIG. 7(B) are views for describing a defined area according to the present embodiment.
Figure 7:
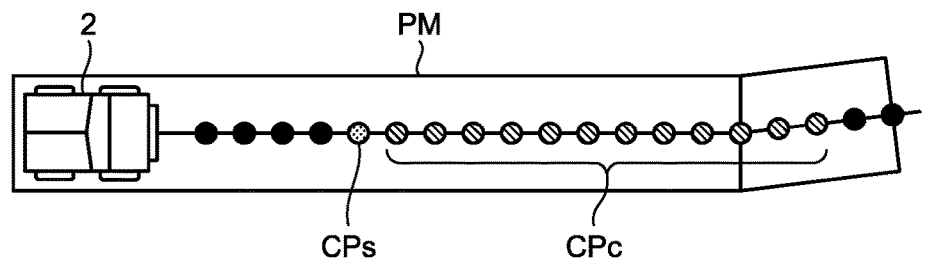
Figure 8:
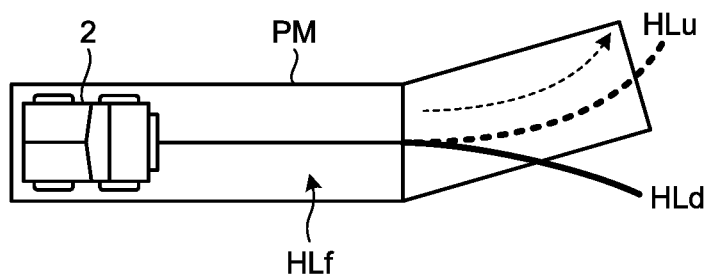
FIG. 8(A) and FIG. 8(B) are views for describing the relationship between the defined area and a travel speed of the unmanned vehicle according to the present embodiment.
Figure 8:
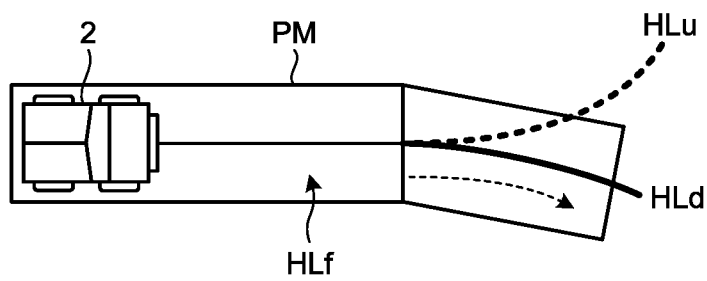

FIG. 7(A) and FIG. 7(B) are views for describing a defined area PM according to the present embodiment. The defined area PM is set on the front side of the unmanned vehicle 2 traveling on the travel path HL. The defined area PM is an area where the unmanned vehicle 2 is scheduled to travel. The defined area PM is set by the defined area setting unit 3B.

The defined area PM is set along the travel course CR. The defined area PM is set to include a plurality of course points CP on the front side of the unmanned vehicle 2.

A length of the defined area PM changes based on a travel speed of the unmanned vehicle 2. The length of the defined area PM refers to a length of the defined area PM in the running direction of the unmanned vehicle 2. As illustrated in FIG. 7(A), the length of the defined area PM becomes shorter as the travel speed of the unmanned vehicle 2 decreases. As illustrated in FIG. 7(B), the length of the defined area PM becomes longer as the travel speed of the unmanned vehicle 2 increases.

In addition, a shape of the defined area PM changes based on the running direction (course) of the unmanned vehicle 2. As illustrated in FIG. 7(B), when the unmanned vehicle 2 runs to the left, the defined area PM is bent to the left.

In this manner, the defined area PM is changed based on the travel speed of the unmanned vehicle 2 and the running direction of the unmanned vehicle 2.

When the defined area PM is set, the speed limit calculation unit 32 calculates the speed limit based on inclination angles related to the plurality of course points CP existing in the defined area PM on the front side of the unmanned vehicle 2. For example, in a case of calculating the average value θav of the inclination angles using the plurality of calculation course points CPc, the course point CP existing inside the defined area PM is used as the calculation course point CPc used to calculate the average value θav. That is, the number of calculation course points CPc is determined based on the defined area PM.

Note that the number of calculation course points CPc used to calculate the average value θav may be changed continuously or discretely when the length of the defined area PM changes. For example, in a case where the course points CP are set at intervals of 1 m and there are four calculation course points CPc inside the defined area PM, the number of calculation course points CPc used to calculate the average value θav may be increased from four to five when the length of the defined area PM is increased by 1 m. Alternatively, the number of calculation course points CPc used to calculate the average value θav may be increased from four to eight when the length of the defined area PM is increased by 4 m without increasing the number of calculation course points CPc used to calculate the average value θav from four to five when the length of the defined area PM is increased by 1 m.

Figure 9:
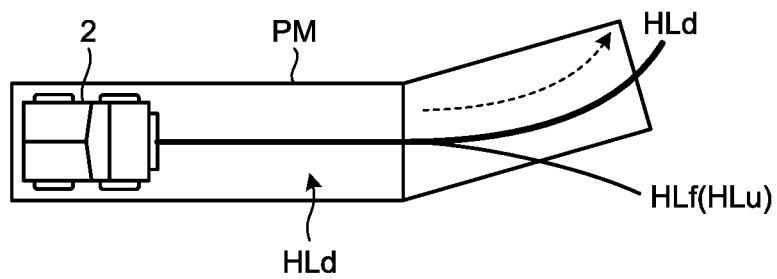
FIG. 9(A) and FIG. 9(B) are views for describing the relationship between the defined area and the travel speed of the unmanned vehicle according to the present embodiment.
Figure 9:
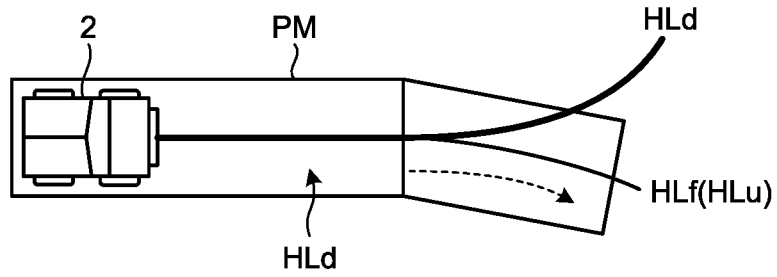

Each of FIG. 8(A) and FIG. 8(B) and FIG. 9(A) and FIG. 9(B) are views for describing the relationship between the defined area PM and the travel speed of the unmanned vehicle 2 according to the present embodiment. FIG. 8 illustrates an example in which the travel path HL branches into the uphill road HLu and the downhill road HLd on the front side of the flat road HLf. FIG. 9(A) and FIG. 9(B) illustrate an example in which the travel path HL branches into the downhill road HLd and the flat road HLf (or the uphill road HLu) on the front side of the downhill road HLd.

As illustrated in FIG. 8(A), when the unmanned vehicle 2 runs from the flat road HLf to the uphill road HLu, at least a part of the uphill road HLu is arranged in the defined area PM. When the unmanned vehicle 2 transitions from the state of traveling on the flat road HLf to the state of traveling on the uphill road HLu, the speed limit of the unmanned vehicle 2 when entering the uphill road HLu from the flat road HLf is calculated based on the speed limit set for the uphill road HLu. Therefore, the speed limit of the unmanned vehicle 2 when entering the uphill road HLu from the flat road HLf is set to a high value. The travel control unit 33 controls the travel speed of the unmanned vehicle 2 based on the inclination data specified by the course point CP arranged in the defined area PM and the correlation data stored in the storage unit 34.

As illustrated in FIG. 8(B), when the unmanned vehicle 2 travels from the flat road HLf to the downhill road HLd, at least a part of the downhill road HLd is arranged in the defined area PM. When the unmanned vehicle 2 transitions from the state of traveling on the flat road HLf to the state of traveling on the downhill road HLd, the speed limit of the unmanned vehicle 2 when entering the downhill road HLd from the flat road HLf is calculated based on the speed limit set in the downhill road HLd. Therefore, the speed limit of the unmanned vehicle 2 when entering the downhill road HLd from the flat road HLf is set to a low value. As described with reference to FIG. 5, the speed limit calculation unit 32 calculates the speed limit at the target course point CPs on the rear side of the inflection point IP among the course points CP arranged in the defined area PM using the inclination data specified by the calculation course point CPc on the front side of the inflection point IP. That is, the unmanned vehicle 2 starts decelerating from the rear side of the inflection point IP.

As illustrated in FIG. 9(A), when the unmanned vehicle 2 travels from the downhill road HLd to the downhill road HLd, at least a part of the downhill road HLd is arranged in the defined area PM. When the unmanned vehicle 2 transitions from the state of traveling on the downhill road HLd to the state of traveling on the downhill road HLd, the travel control unit 33 controls the travel speed of the unmanned vehicle 2 based on the inclination data specified by the course point CP arranged in the defined area PM and the correlation data stored in the storage unit 34.

As illustrated in FIG. 9(B), when the unmanned vehicle 2 travels from the downhill road HLd to the flat road HLf (or the uphill road HLu), at least a part of the flat road HLf is arranged in the defined area PM. When the unmanned vehicle 2 transitions from the state of traveling on the downhill road HLd to the state of traveling on the flat road HLf, the speed limit of the unmanned vehicle 2 when entering the flat road HLf from the downhill road HLd is calculated based on the speed limit set on the flat road HLf. Therefore, the speed limit of the unmanned vehicle 2 when entering the flat road HLf from the downhill road HLd is set to a high value. As described with reference to FIG. 6, the speed limit calculation unit 32 calculates the speed limit at the target course point CPs on the rear side of the inflection point IP among the course points CP arranged in the defined area PM using the inclination data specified by the calculation course point CPc on the front side of the inflection point IP. That is, the unmanned vehicle 2 starts accelerating from the rear side of the inflection point IP.

[Control Method]

Figure 10:
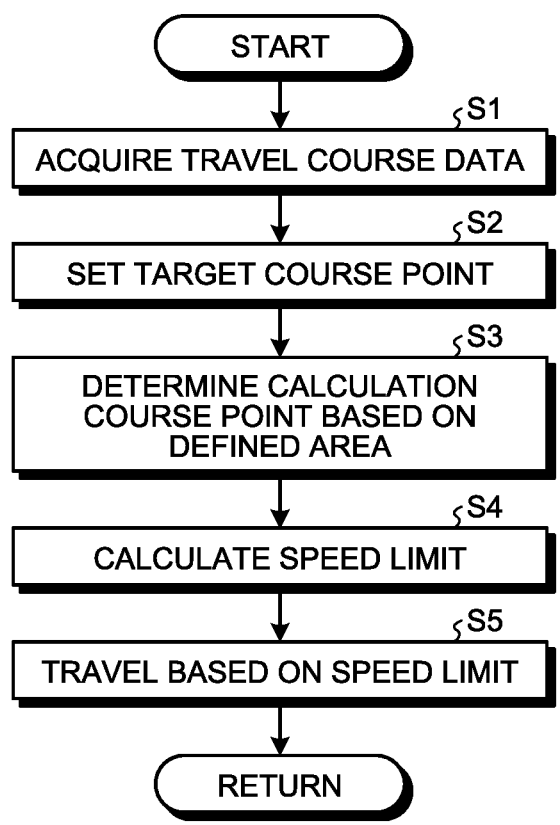
FIG. 10 is a flowchart illustrating an example of an unmanned vehicle control method according to the present embodiment.

FIG. 10 is a flowchart illustrating an example of a control method of the unmanned vehicle 2 according to the embodiment. The travel course data acquisition unit 31 acquires the travel course data transmitted from the travel course data generation unit 3A (Step S1).

The speed limit calculation unit 32 sets the target course point CPs for which the speed limit is calculated, on the rear side of the inflection point IP (Step S2).

The speed limit calculation unit 32 determines the calculation course point CPc for calculating the speed limit at the target course point CPs based on the defined area PM (Step S3).

For example, when calculating the average value θav of the inclination angles, the speed limit calculation unit 32 determines a plurality of calculation course points CPc existing inside the defined area PM.

The speed limit calculation unit 32 calculates the speed limit at the target course point CPs based on the inclination angle related to the calculation course point CPc on the front side of the target course point CPs (Step S4).

The travel control unit 33 causes the unmanned vehicle 2 to travel based on the speed limit calculated in Step S4 (Step S5).

[Computer System]

Figure 11:
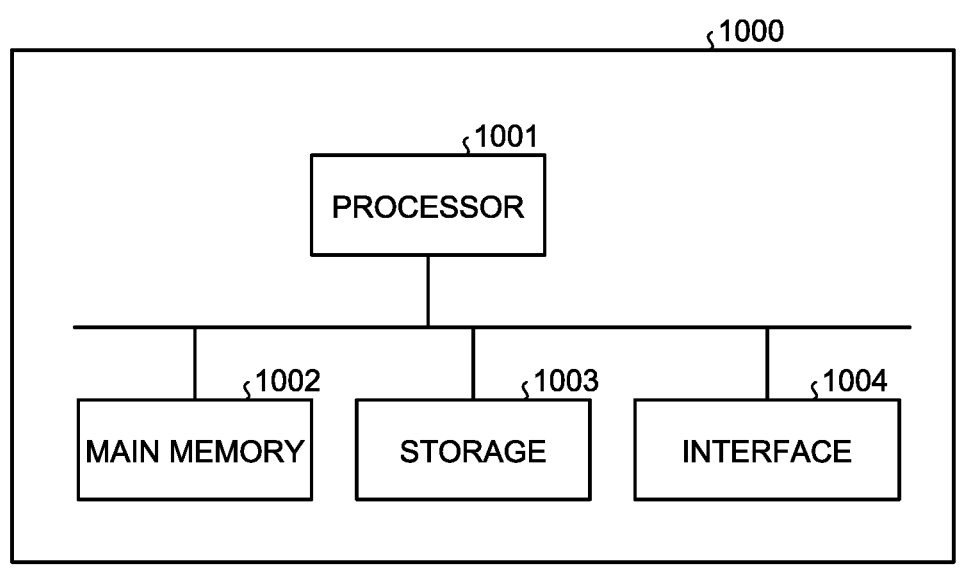
FIG. 11 is a block diagram illustrating an example of a computer system according to the present embodiment.

FIG. 11 is a block diagram illustrating an example of a computer system 1000 according to the present embodiment. Each of the management device 3, the control device 30, and a control device 40 described above includes the computer system 1000. The computer system 1000 includes: a processor 1001 such as a central processing unit (CPU); a main memory 1002 including a nonvolatile memory such as a read only memory (ROM) and a volatile memory such as a random access memory (RAM); a storage 1003; and an interface 1004 including an input/output circuit. The respective functions of the management device 3, the control device 30, and the control device 40 described above are stored in the storage 1003 as programs. The processor 1001 reads the program from the storage 1003, expands the read program in the main memory 1002, and executes the above-described processing according to the program. Note that the program may be delivered to the computer system 1000 via a network.

The computer system 1000 can execute calculating the speed limit of the unmanned vehicle 2 based on the inclination data of the travel path HL on the front side of the unmanned vehicle 2 and causing the unmanned vehicle 2 to travel based on the speed limit according to the above embodiment.

[Effect]

As described above, according to the present embodiment, the travel speed of the unmanned vehicle 2 is suppressed from exceeding the speed limit immediately after the unmanned vehicle 2 transitions from the state of traveling on the flat road HLf to the state of traveling on the downhill road HLd. In addition, the travel speed of the unmanned vehicle 2 is suppressed from being insufficient immediately after the unmanned vehicle 2 transitions from the state of traveling on the downhill road HLd to the state of traveling on the flat road HLf (or the uphill road HLu). Therefore, the control device 30 can cause the unmanned vehicle 2 to travel at an appropriate travel speed.

The speed limit calculation unit 32 calculates the speed limit based on the inclination data related to the plurality of course points CP existing in the defined area PM on the front side of the unmanned vehicle 2. When the travel path HL branches, the travel speed can be controlled according to a destination of the unmanned vehicle 2 by setting the defined area PM as described with reference to FIGS. 8 and 9.

Other Embodiments

The example of calculating the speed limit when the unmanned vehicle 2 passes the inflection point IP has been described in the above embodiment. Even when the unmanned vehicle 2 travels on the travel path HL in which the inflection point IP does not exist and the inclination angle changes gently, the speed limit may be calculated according to the above embodiment.

In the above embodiment, the unmanned vehicle 2 travels according to the travel course data. The unmanned vehicle 2 may travel according to map data where coordinates are defined. In addition, the inclination data may be calculated based on the map data.

In the above embodiment, the speed limit calculation unit 32 calculates the speed limit based on the average value θav of the inclination angles. The speed limit calculation unit 32 may derive a correction coefficient from, for example, the average value θav, and calculate the speed limit based on the derived correction coefficient. The speed limit calculation unit 32 may derive a correction coefficient having a negative value from, for example, the average value θav of the inclination angles of the downhill road HLd, and calculate the speed limit by multiplying an initial value of the speed limit and the derived correction coefficient. The speed limit calculation unit 32 may derive a correction coefficient having a positive value from, for example, the average value θav of the inclination angles of the uphill road HLu, and calculate the speed limit by multiplying an initial value of the speed limit and the derived correction coefficient. Note that the speed limit calculation unit 32 may calculate the speed limit based on the maximum value or the minimum value of the inclination angles related to the plurality of calculation course points CPc.

At least some of the functions of the control device 30 may be provided in the management device 3, and at least some of the functions of the management device 3 may be provided in the control device 30, in the above embodiment.

Note that the travel course data is generated in the management device 3, and the unmanned vehicle 2 travels according to the travel course data transmitted from the management device 3 in the above embodiment. The control device 30 of the unmanned vehicle 2 may generate the travel course data. That is, the control device 30 may have the travel course data generation unit 3A. In addition, each of the management device 3 and the control device 30 may have the travel course data generation unit 3A.

Note that the unmanned vehicle 2 is the dump truck which is a kind of transport vehicle in the above embodiment. The unmanned vehicle 2 may be a wheel-type work machine such as a wheel loader and a motor grader.

Note that the above-described embodiment is an embodiment related to the downhill road HLd, but may be applied to the uphill road HLu. For example, the speed limit calculation unit 32 may derive a correction coefficient having a positive value from the average value θav of the inclination angles of the uphill road HLu, and calculate the speed limit by multiplying an initial value of the speed limit and the derived correction coefficient. Alternatively, the speed limit on the uphill road HLu may be higher than the speed limit of the flat road HLf.

REFERENCE SIGNS LIST

1 MANAGEMENT SYSTEM
2 UNMANNED VEHICLE
3 MANAGEMENT DEVICE
3A TRAVEL COURSE DATA GENERATION UNIT
3B DEFINED AREA SETTING UNIT
4 COMMUNICATION SYSTEM
5 CONTROL FACILITY
6 WIRELESS COMMUNICATION DEVICE
7 LOADER

8 CRUSHER
21 TRAVELING DEVICE
22 VEHICLE MAIN BODY
23 DUMP BODY
24 DRIVE DEVICE
25 BRAKE DEVICE
26 STEERING DEVICE
27 WHEEL
27F FRONT WHEEL
27R REAR WHEEL
28 POSITION DETECTION DEVICE
29 WIRELESS COMMUNICATION DEVICE
30 CONTROL DEVICE
31 TRAVEL COURSE DATA ACQUISITION UNIT
32 SPEED LIMIT CALCULATION UNIT
33 TRAVEL CONTROL UNIT
34 STORAGE UNIT
CP COURSE POINT
CPc CALCULATION COURSE POINT
CPs TARGET COURSE POINT
CR TRAVEL COURSE
PA WORK SITE
DPA DISCHARGING SITE
LPA LOADING SITE
HL TRAVEL PATH
HLd DOWNHILL ROAD
HLf FLAT ROAD
HLu UPHILL ROAD
IP INFLECTION POINT
IS INTERSECTION
PM DEFINED AREA

The invention claimed is:

1. An unmanned vehicle control system comprising:
a processor, the processor being configured to:
   calculate a speed limit of an unmanned vehicle based on inclination data of a travel path in front of the unmanned vehicle;
   acquire travel course data; and
   cause the unmanned vehicle to travel based on the travel course data and the speed limit,
wherein the travel course data includes a plurality of target course points, which define a target travel speed and a target position of the unmanned vehicle, for which the inclination data, which is known data and includes an inclination angle of the travel path, is set,
the speed limit is calculated at a target course point in front of the unmanned vehicle and behind an inflection position which is a boundary between a flat road and a downhill road of the travel path, and
the speed limit is based on inclination data related to a calculation course point in front of the inflection position and on correlation data indicating a relationship between the inclination angle of the travel path and the speed limit of the unmanned vehicle wherein the speed limit on the downhill road is lower than the speed limit on the flat road and an uphill road and the speed limit is set to a maximum value on the flat road and the uphill road.

2. The unmanned vehicle control system according to claim 1, wherein
the speed limit is calculated based on an average value of inclination data related to the target course point and the calculation course point.

3. The unmanned vehicle control system according to claim 1, wherein
the speed limit is calculated based on inclination data related to each of a plurality of course points existing in a defined area on the traveling direction of the unmanned vehicle.

4. The unmanned vehicle control system according to claim 3, wherein
the defined area is changed based on a travel speed of the unmanned vehicle and a running direction of the unmanned vehicle.

5. The unmanned vehicle control system according to claim 4, wherein the length of the defined area becomes shorter as the travel speed of the unmanned vehicle decreases and the length of the defined area becomes longer as the travel speed of the unmanned vehicle increases.

6. The unmanned vehicle control system according to claim 1, wherein a defined area is set on the front side of the dump truck and is set to include a plurality of course points.

7. The unmanned vehicle control system according to claim 6, wherein the length of the defined area is shorter as the travel speed of the unmanned vehicle is lower and the length of the defined area is longer as the travel speed of the unmanned vehicle is higher.

8. The unmanned vehicle control system according to claim 7, wherein the longer the length of the defined area the more calculated course points are used to calculate the average.

9. The unmanned vehicle control system according to claim 1, wherein the inclination data includes a height of the course point.

10. The unmanned vehicle control system according to claim 1, wherein the course points are set at intervals of 1 m.

11. An unmanned vehicle control method comprising:
calculating a speed limit of an unmanned vehicle based on inclination data of a travel path in front of the unmanned vehicle,
acquiring travel course data; and
causing the unmanned vehicle to travel based on the travel course data and the speed limit,
wherein the travel course data includes a plurality of target course points, which define a target travel speed and a target position of the unmanned vehicle, for which the inclination data, which is known data and includes an inclination angle of the travel path, is set,
the speed limit is calculated at a target course point in front of the unmanned vehicle and behind an inflection position which is a boundary between a flat road and a downhill road of the travel path, and
the speed limit is based on inclination data related to a calculation course point in front of the inflection position and on correlation data indicating a relationship between the inclination angle of the travel path and the speed limit of the unmanned vehicle wherein the speed limit on the downhill road is lower than the speed limit on the flat road and an uphill road and the speed limit is set to a maximum value on the flat road and the uphill road.

12. The unmanned vehicle control method according to claim 11, wherein the speed limit is calculated based on an average value of inclination data related to the target course point and the calculation course point.

13. The unmanned vehicle control method according to claim 11, wherein the speed limit is calculated based on inclination data related to each of a plurality of course points existing in a defined area on the traveling direction of the unmanned vehicle.

14. The unmanned vehicle control method according to claim 13, wherein the defined area is changed based on a travel speed of the unmanned vehicle and a running direction of the unmanned vehicle.

15. The unmanned vehicle control method according to claim 14, wherein the length of the defined area becomes shorter as the travel speed of the unmanned vehicle decreases and the length of the defined area becomes longer as the travel speed of the unmanned vehicle increases.

16. The unmanned vehicle control method according to claim 11, wherein a defined area is set on the front side of the dump truck and is set to include a plurality of course points.

17. The unmanned vehicle control method according to claim 16, wherein the length of the defined area is shorter as the travel speed of the unmanned vehicle is lower and the length of the defined area is longer as the travel speed of the unmanned vehicle is higher.

18. The unmanned vehicle control method according to claim 17, wherein the longer the length of the defined area the more calculated course points are used to calculate the average.

19. The unmanned vehicle control method according to claim 11, wherein the inclination data includes a height of the course point.

20. The unmanned vehicle control method according to claim 11, wherein the course points are set at intervals of 1 m.

* * * * *